United States Patent [19]

Picotte

[11] Patent Number: 4,573,863

[45] Date of Patent: Mar. 4, 1986

[54] FLUID DRIVEN TUBE POSITIONER

[75] Inventor: Ronald T. Picotte, Murray, Utah

[73] Assignee: St. Regis Corporation, New York, N.Y.

[21] Appl. No.: 670,888

[22] Filed: Nov. 13, 1984

[51] Int. Cl.$^4$ .............................................. B65G 47/24
[52] U.S. Cl. ..................................... 414/763; 198/403; 198/413; 414/765; 414/776
[58] Field of Search ...................... 414/31, 55, 56, 758, 414/761, 762, 763, 764, 765, 766, 776, 783; 198/403, 413, 414

[56] References Cited

U.S. PATENT DOCUMENTS

| 2,293,192 | 8/1942 | Campbell | 414/763 X |
| 2,865,517 | 12/1958 | Alford | 414/766 |
| 3,063,575 | 11/1962 | Fontana | 414/776 |
| 3,071,258 | 1/1963 | Seigh et al. | 414/767 X |
| 3,895,722 | 7/1975 | Pluntz | 414/766 |
| 3,946,880 | 3/1976 | Schmitt | 414/783 X |

FOREIGN PATENT DOCUMENTS

| 2040730 | 2/1972 | Fed. Rep. of Germany | 414/766 |
| 2205153 | 8/1973 | Fed. Rep. of Germany | 198/414 |
| 57-141337 | 9/1982 | Japan | 414/758 |

Primary Examiner—Leslie J. Paperner
Attorney, Agent, or Firm—Joseph M. Maguire

[57] ABSTRACT

Apparatus for positioning or orienting a hand of tubes, or the like, includes clamp arms for clamping the hand while on a conveyor, a fluid activated ram for raising the hand, inverting it 180°, lowering it back onto the conveyor, and releasing the clamp arms. The device may also be tilted while in elevated position so that the clamp arms and hand avoid contact with personnel during inversion.

5 Claims, 8 Drawing Figures

FLUID DRIVEN TUBE POSITIONER

BACKGROUND OF THE INVENTION

1. Field of the Invention

This invention relates to tube positioners, and more particularly, to apparatus for orienting a hand of multiwall paper tubes, or the like, for presentation to an ender or bottomer which closes and seals one end of each tube to form a shipping sack.

2. Description of the Prior Art

Since customer requirements vary, some requiring the tubes to be ended flap-to-face at one end or at the opposite end, or flap-to-back at one end or at the opposite end, the tubes must be oriented for proper entry into an ender based upon those requirements.

Tubes formed in a tuber are placed on a conveyor in shingled disposition and advanced to a gate or hand forming means which stack the tubes by interfering with their advance for a determined period of time during which the tubes slide along one another to abut against the gate thus to form a stack or hand of the desired number of tubes. When the hand is constituted by the desired number of tubes, the gate opens and the conveyor moves the hand through the gate.

It was usual manually to reorient the tubes on the conveyor, if necessary, to meet customer requirements or, if for any reason the ender could not accept tubes at the rate of output of the tuber, the hands were removed from the conveyor and returned at a later time to be placed on the conveyor in proper orientation for further processing. In either case the procedure necessitated relatively high labor costs.

SUMMARY OF THE INVENTION

I have conceived and contribute by the present invention a tube positioner by which I am able to overcome the foregoing difficulties and disadvantages and automatically properly to orient the tubes. Thus, if the tubes are to be ended flap-to-back, i.e. to the undersurface of the tubes as they come from the tuber, then the tube positioner to be described hereinafter lifts a hand of tubes from the conveyor, inverts the hand by effectively rotating it 180° about an axis perpendicular to the direction of advance of the hand on the conveyor, that direction being parallel to the longitudinal axis of the tubes, and returns the inverted hand to the conveyor for further transportation to the ender. If the tubes are to be ended flap-to-face, the positioner of the present invention is not operated and the hand is simply conveyed on towards the ender. It should be understood that the hand may be rotated 180° about a vertical axis by other apparatus disposed, for example, between the positioner and the ender, that apparatus not constituting a part of the present invention.

In any case, it will be seen that by selective actuation of the two devices, the tubes may be oriented for presentation to the ender for ending flap-to-face at the leading end of the tubes as they leave the tuber, flap-to-face at the trailing end of the tubes as they leave the tuber, flap-to-back at the leading end or flap-to-back at the trailing end.

According to one aspect of the present invention, I provide clamp means adapted to engage the respective upper and lower surfaces of a hand of tubes, means for raising the clamp means, and thus the hand, and means for inverting the clamp means and hand by rotating the same about an axis perpendicular to the longitudinal axis of the tubes constituting the hand, means for lowering the clamp means and the hand and releasing the clamp means from the hand to deposit the hand back on the surface. The clamp means may comprise a frame and two sets of elongate clamp arms carried by the frame, at least one of the sets of clamp arms being movable relative to the other into and out of tube hand clamping position.

The clamp means also include guide means which may take the form of an elongate bar and means mounting at least one of the sets of clamp arms on the bar for reciprocating movement therealong to maintain the arms parallel to one another throughout their range of relative movement.

I also provide drive means connected to the frame and at least one of the sets of clamp arms to effect the relative movement therebetween.

Actually, I prefer that both sets of clamp arms move relative to one another, wherefor I mount both sets of arms on the guide bar and provide that the drive means include a double acting fluid activated ram for each clamp arm set.

According to a further aspect of the invention, I provide means, preferably in the form of another double acting ram for elevating or lifting the entire clamp means so that when a hand of tubes is to be inverted, the clamp means is elevated to lift the hand from the surface upon which it rests prior to inversion, the hand being returned to that surface following inversion by lowering the clamp means through the agency of this ram.

More specifically, the hand of tubes is delivered from the stacker or hand former along a conveyor of the type comprising parallel rollers, to a station at the tube positioner. The lower set of clamp arms are positioned below the conveyor and, when actuated, rise between rollers of the conveyor to contact the lower surface of the hand while the upper set of clamp arms descend to contact the upper surface of the hand. The entire frame is then elevated and rotated 180°, as already mentioned, after which the frame is lowered to its start position to deposit the inverted hand back on the conveyor.

In the interest of safety, that is, to protect workers who may be in the vicinity of the tube positioner during inversion of the hand, I have provided the device with means for tilting the clamp means, and a hand of tubes engaged thereby, in a vertical plane when in elevated position prior to inversion thereof and to return the clamp means and the hand to non-tilted condition following inversion. Due to this arrangement, the distal ends of the clamp arms are positioned linearly inwardly of the side of the conveyor most remote from the tube positioner during inversion.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawings, forming a part of the specification wherein:

FIG. 8 is a view similar to FIG. 7 but illustrating the clamp means and hand of tubes during inversion.

Figure 1:
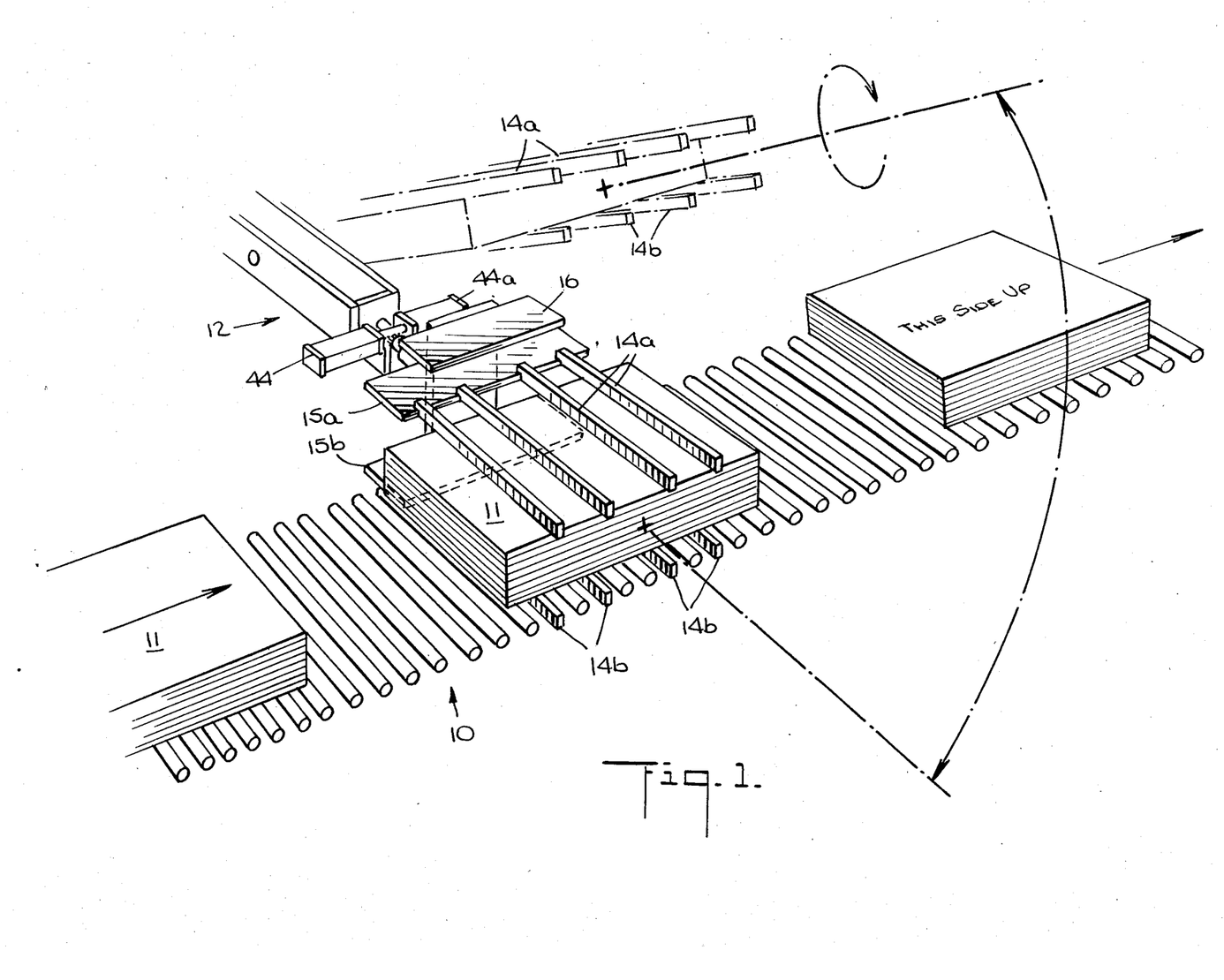
FIG. 1 is a perspective view of a portion of a tube positioner of the present invention illustrating in solid lines a hand of tubes on a roller conveyor in clamped condition and showing the same in phantom lines in elevated, tilted position.

Referring to FIG. 1 of the drawing, there is shown a driven roller conveyor 10 for transporting hands of tubes 11 in the direction indicated by the arrows. A hand of tubes 11 is shown approaching the tube positioner station from the left, while a second hand is shown at that station and a third hand, having been inverted as indicated by the legend THIS SIDE UP in FIG. 1, is shown downstream of the positioner station enroute to an ender (not shown).

The tube positioner 12, only a portion of which is shown in FIG. 1, includes upper and lower clamp arms 14a, 14b, respectively, in clamping engagement with the hand of tubes at the positioner station, the inner ends of these clamp arms being connected to respective horizontal plates 15a, 15b which plates are movable vertically relative to clamp frame 16 by means later to be described.

It will be noted that the clamp arms 14a, 14b extend parallel to the longitudinal axes of the conveyor rollers and across the width of the tubes and that the lower clamp arms 14b are each sized and positioned to fit between adjacent rollers.

As indicated in phantom, the hand is lifted from the conveyor and rotated 180° in the direction of the circular arrow, about an axis parallel to the clamp arms 14a, 14b, which axis is perpendicular to the longitudinal axis of the tubes constituting the hand 11. The inverted hand is then returned to the conveyor.

Acutually, as shown in FIGS. 5 to 8, the hand is first clamped, is raised vertically, is tilted upwardly toward the tube positioner by means later to be described and is rotated or inverted while in the tilted position. This tilting action shifts the distal ends of the clamp arms upwardly and inwardly of the vertical plane of the side of the conveyor remote from the positioner to protect personnel in the vicinity of that side of the conveyor from being struck by the device during inversion.

Figure 2:
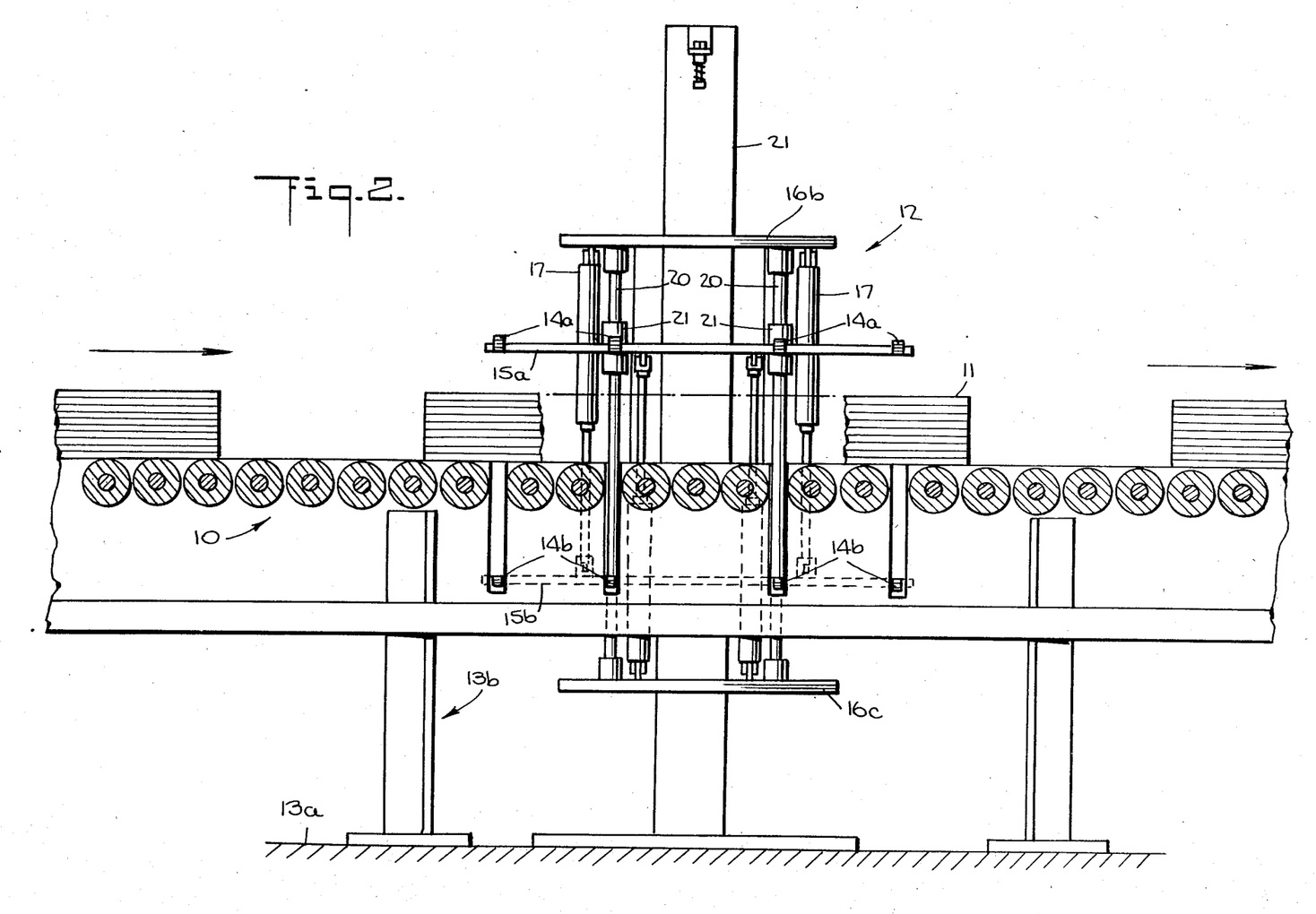
FIG. 2 is an elevational view of the structure shown in FIG. 1 but with the clamp means in non-clamping or release condition.

FIG. 2 illustrates the conveyor 10 supported on a base 13a by suitable framing 13b and bearing a formed hand 11 at the left, a second hand about to be inverted at the positioner station and a third inverted hand at the right, the arrows indicating the conveying direction.

In this view, the clamp arms 14a, 14b are shown out of clamping engagement with the hand of tubes at the positioner station, it being noted that the lower clamp arms 14b are positioned below the conveyor but able to pass between appropriately spaced rollers to contact the hand 11 at the positioner.

Figure 4:
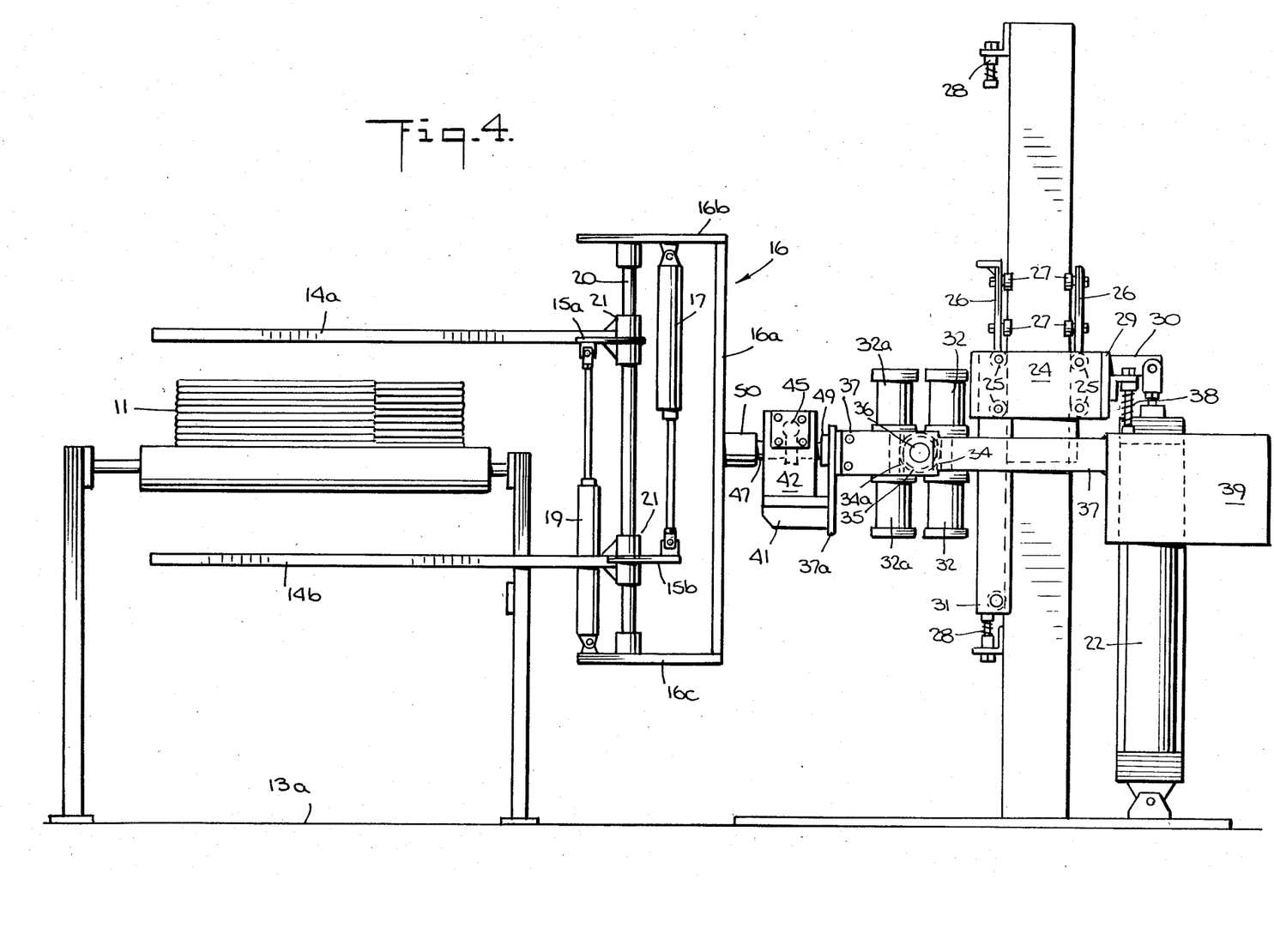
FIG. 4 is a side elevational view of the structure of FIG. 3 and showing a hand of tubes on the conveyor with the clamp arms open or in release condition.

As mentioned, the clamp arms 14a and 14b are connected to plates 15a, 15b, respectively, which plates are movable vertically relative to frame 16. To this end, and as shown in FIGS. 2 and 4, the frame 16 is U-shaped having a vertical member 16a and horizontal members 16b, 16c extending from the respective upper and lower ends thereof. The upper horizontal member 16b has a pair of pneumatic rams 17 connected thereto, the remote ends of the piston rods of which are connected to the plate 15b, while rams 19 are connected to the horizontal member 16c and have their piston rods connected to the plate 15a. Guide means in the form of a pair of elongate bars 20 extend between the members 16b and 16c and the plates 15a, 15b are connected to these bars 20 by suitable bushings 21 for reciprocating movement therealong to maintain the clamp arms stable and parallel to one another throughout their range of relative movement. Thus, when the piston rods of the rams 17 and 19 are extended, the clamp arms 14a, 14b are also extended or in non-clamping position; when the rams are contracted, the clamp arms are drawn together into clamping position.

Figure 3:
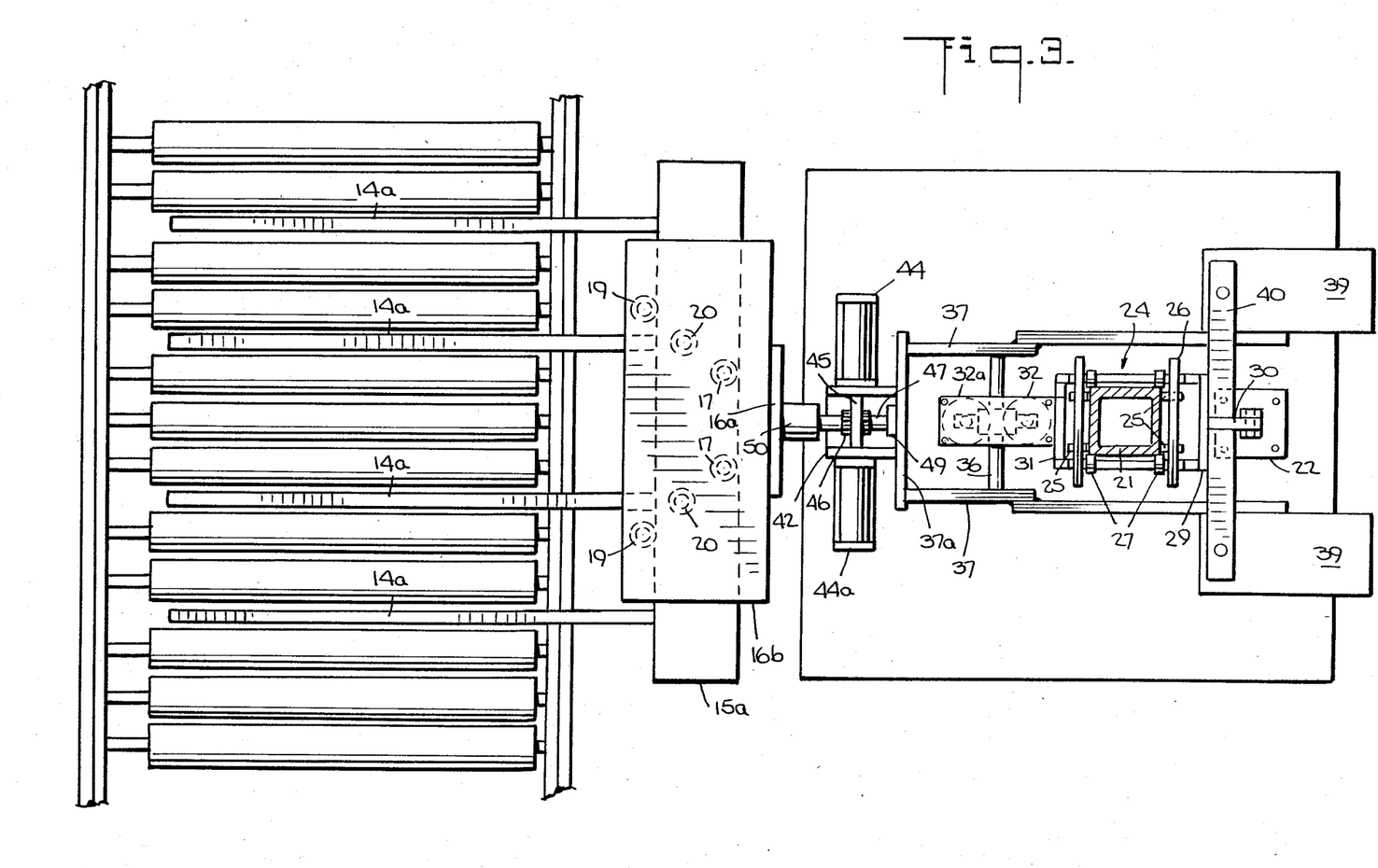
FIG. 3 is a top plan view of the tube positioner and illustrating its positional relationship to the conveyor.
Figure 5:
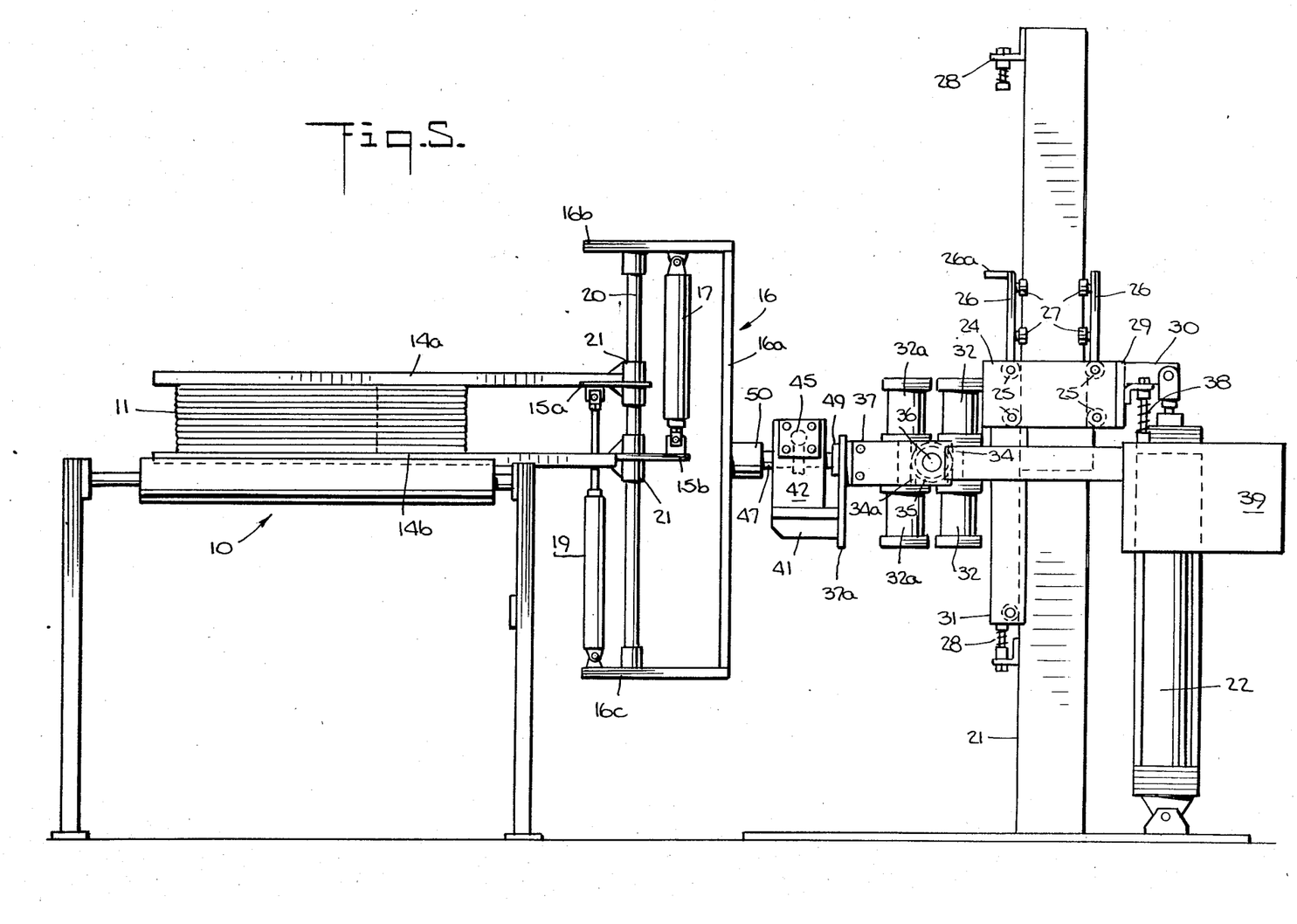
FIG. 5 is a view similar to FIG. 4 but showing the clamp arms clamping a hand of tubes on the conveyor.
Figure 6:
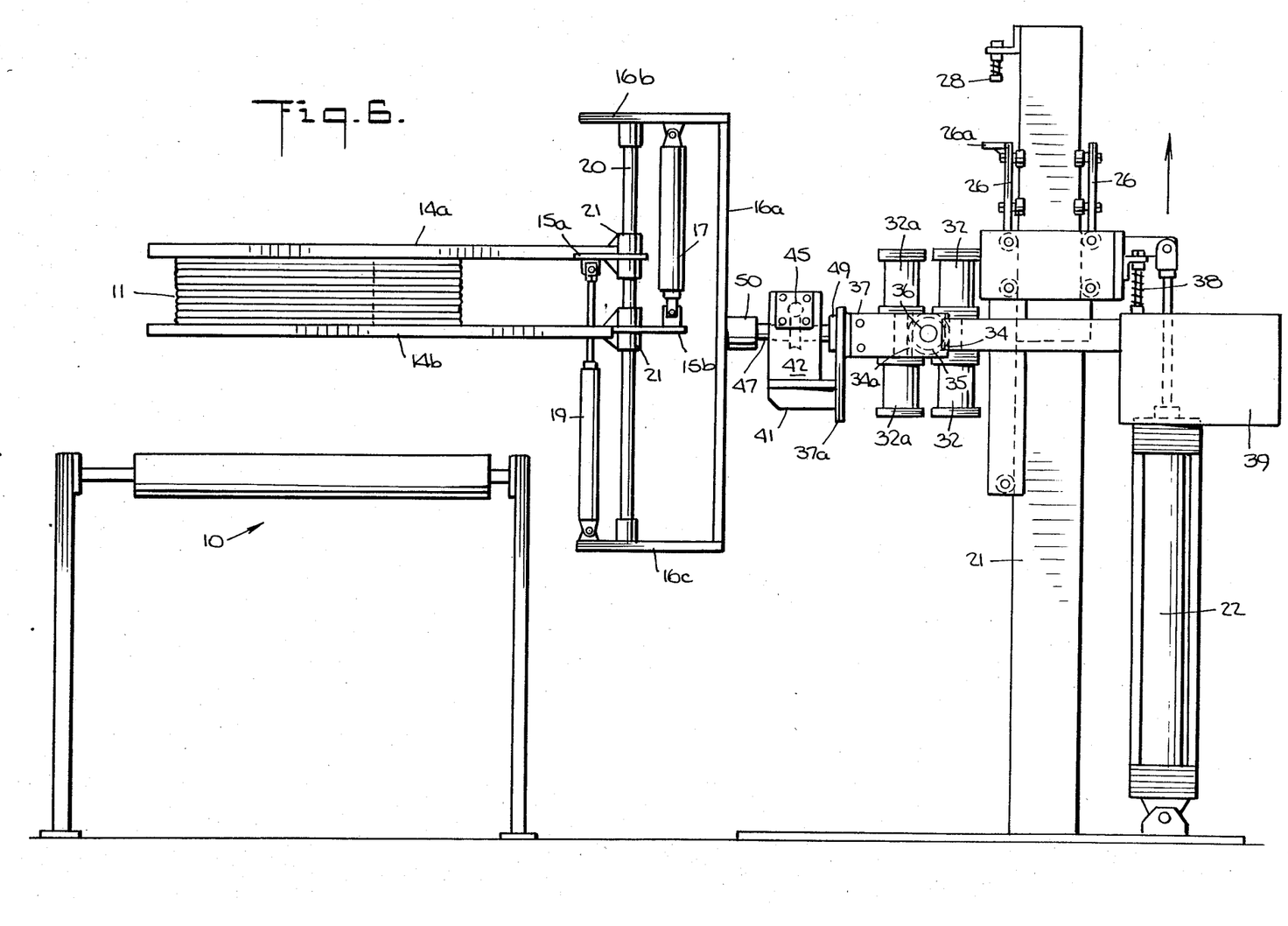
FIG. 6 is a view similar to FIGS. 4 and 5 but showing the clamped hand lifted or elevated from the conveyor.

FIGS. 3, 5 and 6 illustrate the means by which a clamped hand of tubes 11 is raised from the conveyor 10, these means comprising a vertical post 21, square in cross-section and a vertically disposed double-acting ram 22. A box-like structure 24 surrounds the post 21 and carries pairs of forward and rear wheels 25 as well as upwardly extending plates 26 each carrying pairs of side wheels 27, each of the wheels contacting respective surfaces of the post. The structure 24 includes a rear lateral plate 29 connected by horizontal arm 30 to the piston rod of ram 22, and a forwardly disposed depending bar 31 which supports the forward portion of the positioner by means later to be described. In any case, it will be appreciated that when the ram 22 is extended, as in FIG. 6, the entire positioner is raised vertically under control provided by structure 24 guided lengthwise along the post 21 by the wheels 25 and 27 until its movement is terminated by a conveniently located mechanical stop, not shown, on arm 26a on one of the plates 26 contacting an adjustable hydraulic shock absorber 28 at the top of the post 21 to cushion the upward movement of the positioner of the positioner near the end of its excursion. The contracting stroke of the ram 22 lowers the positioner to its FIG. 5 position at which another unshown stop terminates the downward movement, the bar 31 contacting another shock absorber 28 near the lower end of the post 21.

As shown in FIGS. 3 and 4, the bar 31 carries two pairs of vertically disposed rams 32, 32a the pistons of each pair of which are connected by racks 34, 34a, respectively, engaging opposite sides of a pinion 35 mounted for rotation on a horizontal shaft 36, the ends of which are secured to the legs of a rearwardly facing U-shaped member 37, which legs support counterweights 39 by means of cross-bar 40.

The forward end of the member 37 supports, by means of a downward extension 37a thereof, platform 41 (FIG. 4) carrying oppositely disposed, vertical plates 42 upon which are mounted opposed rams 44, 44a (FIG. 3), having a common piston rod 45 with teeth cut in its under surface so that it acts as a rack, its teeth engaging pinion 46 on shaft 47 journaled at one end in a bearing 49 on member 37 and enlarged as at 50 at its other end for connection to the frame 16.

In operation, a hand of tubes 11 is transported to the positioner station where its presence is sensed by known means. If the tubes constituting the hand are oriented so that they do not require inversion for entry into the ender, then they advance toward the ender; if the hand requires inversion, they are stopped at the positioner and the rams 17 and 19 are fluid activated to bring clamp arms 14a and 14b towards the hand to clamp the same firmly therebetween, as shown in FIG. 5.

Next, as shown in FIG. 6, the ram 22 is activated to extend its piston rod thus lifting the positioner and the hand 11 vertically under guidance of the post 21.

Figure 7:
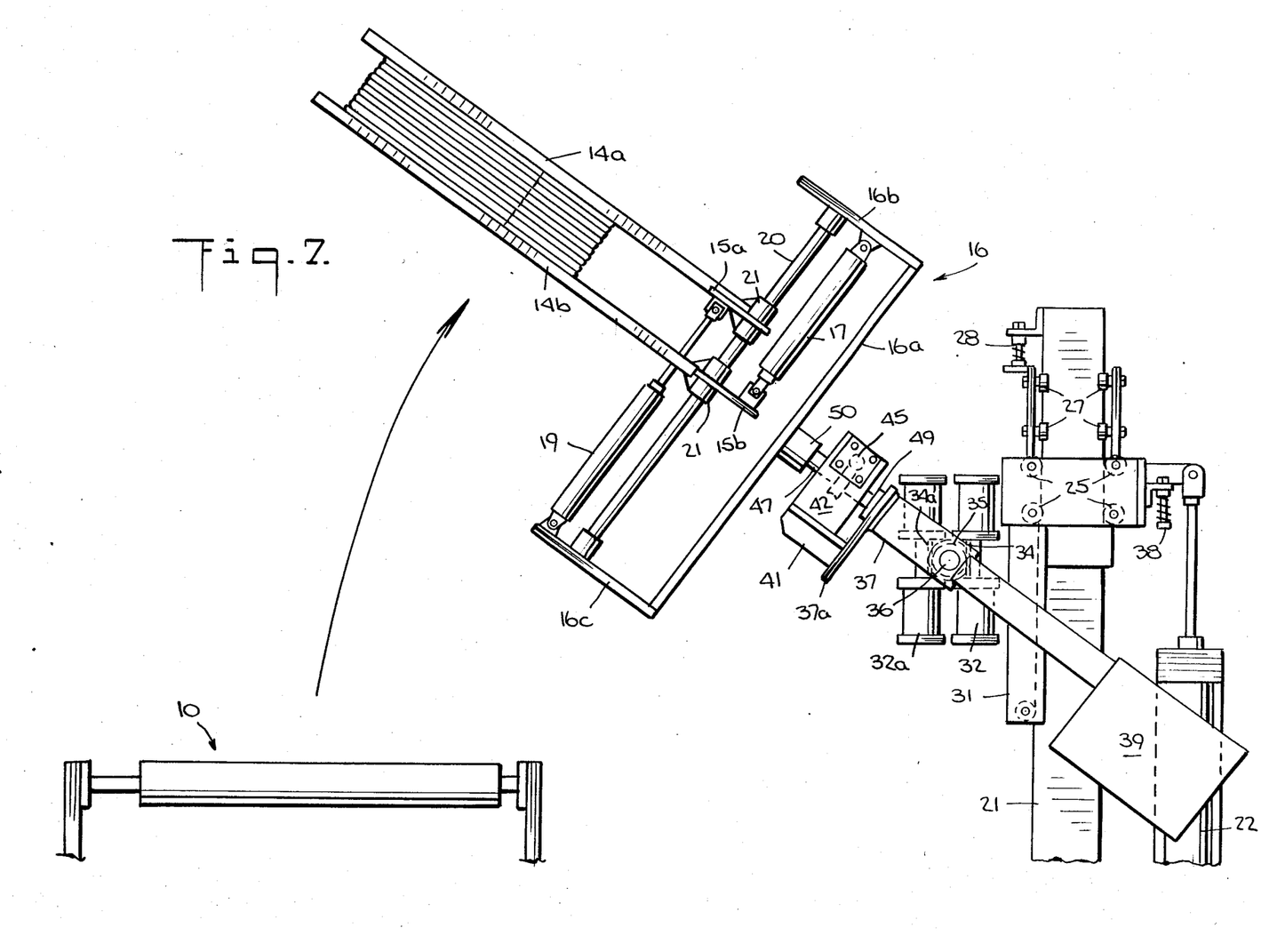
FIG. 7 is a partial side elevational view showing the clamp means carrying a hand of tubes and tilted upwardly from the horizontal.
Figure 9:
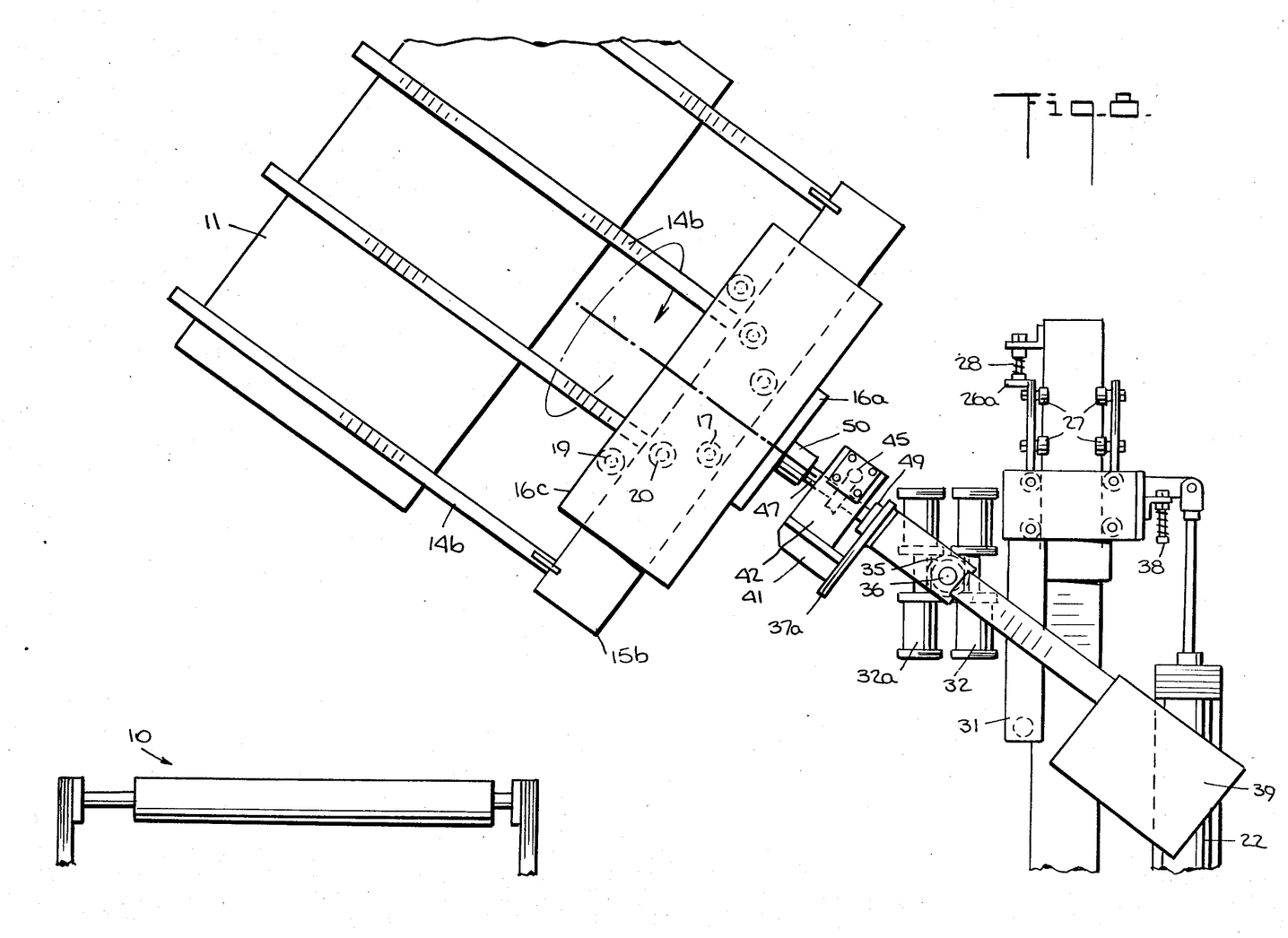

When the positioner is fully elevated, as shown in FIG. 6, the rams 32 operate together to shift the rack 34 downwardly thus driving pinion 35 clockwise about 45°, as viewed, around shaft 36 and rotating the frame 16, the clamp arms 14a, 14b and the hand 11 upwardly and the counterweights 39 downwardly to the position shown in FIG. 7 to bring the distal ends of the clamp arms and the hand to a position inward of the plane of the left side of the conveyor, as viewed, and therefore away from personnel in that area.

One of the rams 44, 44a (FIG. 3) is then activated to rotate pinion 46 and shaft 47, and therefore frame 16, clamp arms 14a, 14b and the hand 11 180°, as indicated in FIGS. 1 and 8, the non-activated ram being vented.

Rams 32a are then activated, rams 32 being vented, to tilt the frame 16, clamp arms 14a, 14b, the hand and counterweights 39 back to the horizontal position of FIG. 6 the counterweights contacting and compressing shock absorbers 38, only one of which is shown, and the return movement being limited by a conveniently positioned stop, not shown. The ram 22 is then retracted bringing the hand 11 back down to the conveyor 10, as in FIG. 5, and rams 17 and 19 are extended to remove the clamp arms 14a, 14b from the inverted hand 11 allowing the conveyor to transport the hand toward the ender.

While the various rams may be activated by hydraulic or pneumatic fluid under pressure, I prefer to use the latter and it will be understood that while the usual pneumatic lines are connected from a pressurized air source to the rams, these have not been depicted in the drawing in order to maintain clarity. In this connection, the rams 44, 44a are operated alternately to effect 180° inversion of the hand in opposite directions to prevent the pneumatic lines connected to those rams from becoming wound around the device.

The sequence of operations described above is controlled by sensing means such as photoelectric detectors and microswitches for sensing the various positions of elements of the device, these sensors cooperating with a control unit, not depicted, which is a standard Allen Bradley industrial terminal Model 1770-TI programmable by the user to perform various desired functions in selected sequence through a series of relays responsive to the sensing means.

I believe that the construction and operation of my novel tube positioner will now be understood and that the several advantages thereof will be fully appreciated by those persons skilled in the art.

I claim:

1. A tube positioner for inverting a hand of tubes resting on a surface, comprising:

clamp means for engaging opposed surfaces of the hand of tubes including a U-shaped frame, a guide bar having its opposite ends connected to the legs of the frame, and two sets of clamp arms carried by the frame and adapted to engage the opposed surfaces of the hand of tubes, one set of clamp arms being mounted on the guide bar for reciprocating movement therealong parallel to the other set of clamp arms;

means for elevating and lowering the clamp means relative to said surface, after both sets of clamp arms engage the hand of tubes, along a first reference axis extending in a vertical direction;

means for tilting the clamp means in its elevated condition, prior to inverting the hand of tubes, about a second reference axis extending perpendicular to the first reference axis and for returning the clamp means to its non-tilted condition after inverting the hand of tubes;

means for inverting said clamp means and the hand of tubes engaged thereby about a third reference axis extending perpendicular to the second reference axis; and means for releasing said clamp means from the hand of tubes to deposit the inverted hand of tubes on the surface.

2. A tube positioner according to claim 1 and further including drive means connected to one of the legs of said frame and to said one set of clamp arms for moving said clamp arm sets relative to one another.

3. A tube positioner according to claim 2, wherein said drive means comprise fluid activated rams.

4. A tube positioner according to claim 1, wherein each set of clamp arms is mounted on the guide bar for reciprocating movement therealong parallel to each other, and drive means are connected to the legs of the frame and to each set of clamp arms for moving the sets of clamp arms relative to one another.

5. A tube positioner according to claim 4 wherein the drive means comprise double acting fluid activated rams extending between the legs of the frame and each set of clamp arms for moving each set of clamp arms along the guide bar.

* * * * *